J. B. OSBORN.
CORN HUSKING MACHINE.
APPLICATION FILED APR. 20, 1910.

966,238.

Patented Aug. 2, 1910.
3 SHEETS—SHEET 1.

Witnesses
J. H. Crawford.
Wm. T. Ragger.

Inventor
Joseph B. Osborn
By Victor J. Evans
Attorney

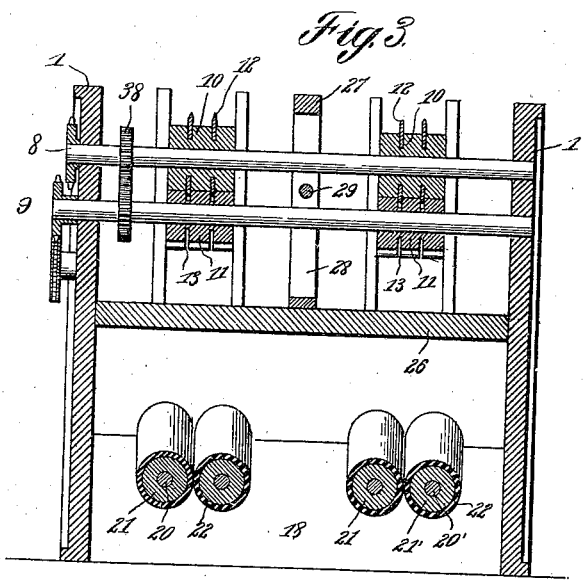

J. B. OSBORN.
CORN HUSKING MACHINE.
APPLICATION FILED APR. 20, 1910.

966,238.

Patented Aug. 2, 1910.

3 SHEETS—SHEET 3.

Witnesses
J. H. Crawford,
W. M. Bagger.

Inventor
Joseph B. Osborn,
By Victor J. Evans
Attorney

UNITED STATES PATENT OFFICE.

JOSEPH B. OSBORN, OF LEBANON, OHIO.

CORN-HUSKING MACHINE.

966,238.   Specification of Letters Patent.   Patented Aug. 2, 1910.

Application filed April 20, 1910. Serial No. 556,533.

*To all whom it may concern:*

Be it known that I, JOSEPH B. OSBORN, a citizen of the United States of America, residing at Lebanon, in the county of Warren and State of Ohio, have invented new and useful Improvements in Corn-Husking Machines, of which the following is a specification.

This invention relates to corn husking machines, and it has for its object to produce a machine of this class which shall possess superior advantages in point of simplicity, durability and general efficiency.

A further object of the invention is to provide simple and efficient means for cutting or chopping the stalks from the ears or from the ear carrying portions and permitting the latter to drop to the husk stripping mechanism.

A further object of the invention is to provide simple and efficient means for loosening the husks upon the ears before engaged by the stripping rollers.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
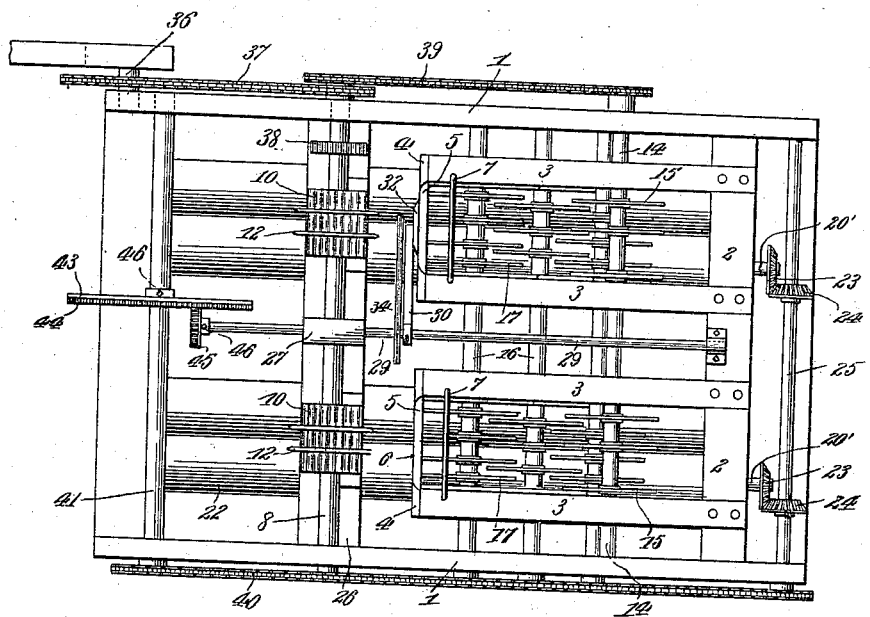
Figure 2:
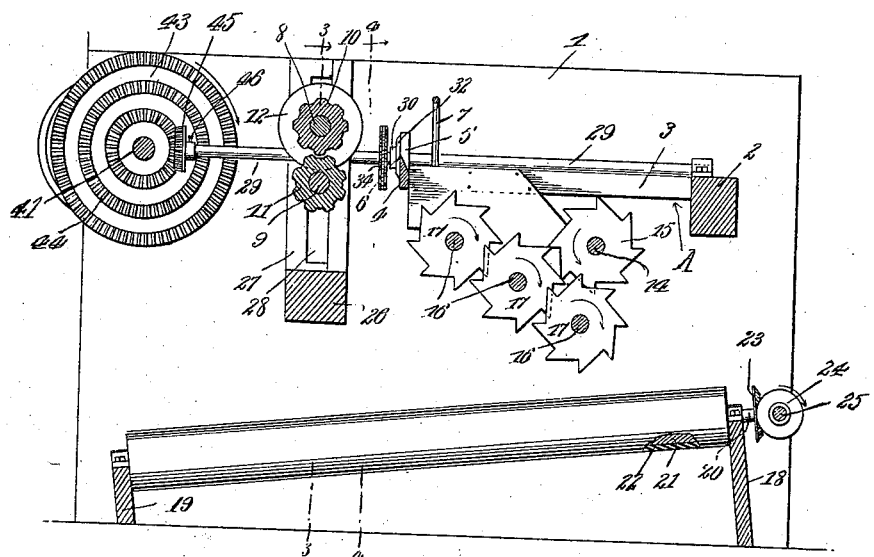
Figure 5:
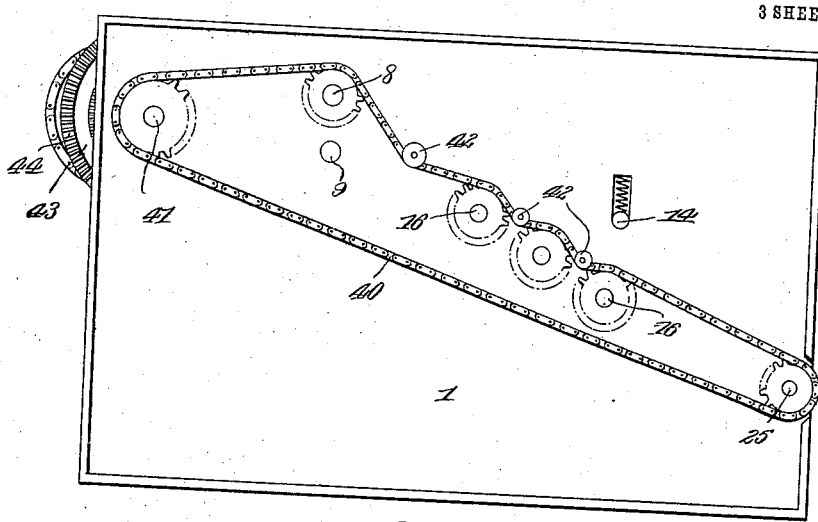
Figure 6:
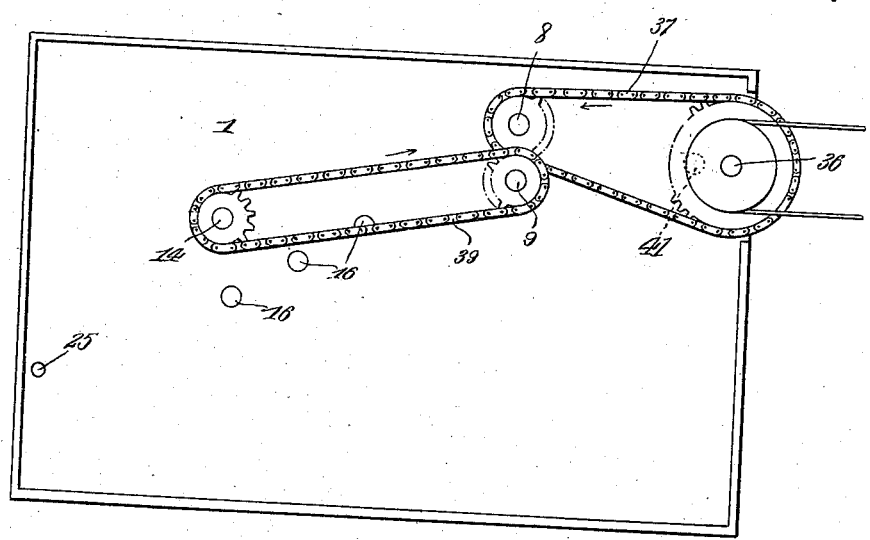
Figure 7:
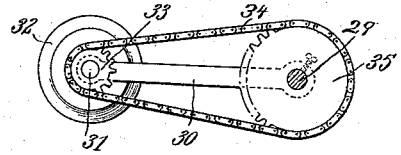

In the drawings,—Figure 1 is a top plan view of a machine constructed in accordance with the invention. Fig. 2 is a longitudinal vertical sectional view of the same. Fig. 3 is a vertical transverse sectional view taken on the plane indicated by the line 3—3 in Fig. 2. Fig. 4 is a vertical transverse sectional view taken on the plane indicated by the line 4—4 in Fig. 2. Fig. 5 is a side elevation. Fig. 6 is a side elevation taken from the opposite side. Fig. 7 is a detail view in elevation on a larger scale of the cutting device carried by the shaft 29, the latter being shown in section.

Corresponding parts in the several figures are denoted by like characters of reference.

The frame of the improved machine includes side members 1, 1 which are suitably connected and spaced apart by cross bars to which reference will hereinafter be made. The side members, while represented as being solid, may obviously consist of skeleton castings for the purpose of securing the necessary strength without excessive weight.

A cross bar 2 which constitutes a part of the main frame structure serves to support rearwardly extending frames A, each consisting of arms or side members 3, 3 connected at their rear ends by a cross piece 4 having a recess 5 provided with a beveled edge 6. The arms 3, 3 are also connected adjacent to the cross piece 4 by a yoke 7 which coöperates with the recessed cross piece to form a guide for the cut ends of the stalks that are being fed to the machine.

The side members of the main frame are provided with bearings for shafts 8, 9 which are disposed one above the other in rear of the cross pieces 4. Said shafts are provided with corrugated feed rollers 10, 11 arranged in rear of the feed frames, the rollers 10 of the upper shaft being equipped with circular cutting disks 12· engaging annular grooves 13 in the lower rollers 11. These feed rollers take hold of the butt ends of the stalks that are being fed over the feed frames and carry the stalks in a rearward direction, serving at the same time to mash the stalks and to split or shred them longitudinally.

A shaft 14 supported transversely in the frame of the machine below the feed frames is equipped with saw toothed cutting disks 15, said disks lying beneath the frames A. A series of shafts 16 are arranged in an inclined plane below the frames A and the shaft 14, the uppermost shaft 16 being closely adjacent to the rear ends of the frames A, while the lowermost shaft 16 is disposed below the shaft 14. The several shafts 16 are equipped with saw toothed disks 17 which are rotated reversely to the disks 15 and coöperate therewith to slit or loosen the husks of the ears of corn dropping therebetween.

Cross bars 18 and 19 forming part of the frame structure adjacent the front and rear ends, respectively, are provided with bearings for shafts 20, 20′ carrying the stripping rollers 21, 21′ which are preferably covered with rubber, as shown at 22. The cross bars 18 and 19 are so located that the roller carrying shafts will be disposed in a downwardly and rearwardly inclined plane. One shaft 20′ of each pair or set of rollers is equipped with a bevel gear 23 meshing with a corresponding bevel gear 24 upon a transverse shaft 25 in front of the cross bar 18.

A cross bar 26 forming part of the frame structure below the shaft 9 supports an upright 27 having a slot 28 for the passage of the shafts 8 and 9, and said upright, together with the cross bar 2, serves to support a longitudinally disposed shaft 29 having an outwardly extending arm 30 at the outer end of which is supported a shaft 31 carrying a cutting disk 32 and a sprocket wheel 33, the latter being connected by a chain 34 with a sprocket wheel 35 upon the shaft 29 from which latter rotary motion will thus be transmitted to the shaft 31 carrying the cutting disk. The arm 30 is of such length that the cutting disk 32, which is supported for orbital movement, will pass adjacent to the cross bars 4 and yokes 7 of the frames A, A alternately, as will be readily understood. It will likewise be understood that the stalks which are fed over the respective frames will be engaged by the rotary cutter 32 as it descends at one side of the machine and as it ascends at the other side of the machine, the stalks engaged by the cutter in its ascending movement being supported by the yoke 7 so as to positively prevent displacement of the stalks by the cutter.

A main driving shaft 36 is supported for rotation adjacent to one end of the frame, and motion is transmitted from said shaft by a chain 37 to the shaft 8, which latter is connected with the shaft 9 by intermeshing gears 38. From the shaft 9 motion is transmitted by a chain 39 to the shaft 14 carrying the cutting disk 15. From the opposite end of the shaft 8 motion is transmitted by an endless chain 40 to the cutter carrying shafts 16, to the shaft 25 and also to a shaft 41 which is supported for rotation adjacent to the rear end of the machine. Idlers 42 may be employed for tightening the chain wherever it shall be deemed necessary in order to insure efficiency of operation. The shaft 41 carries a disk 43 having several concentric series of beveled teeth 44, any one of which series may be placed in engagement with a bevel pinion 45 upon the shaft 29 to which rotation may thus be imparted at various speeds. The disk 44, as well as the pinion 45, are movable upon their respective shafts where they may be held in adjusted position by set screws 46. The pinion may thus be placed in mesh with any one of a series of teeth 44 for the purpose of varying the speed. Motion is imparted to the stripping rollers from the shaft 25 by the intermeshing bevel gears 23, 24.

From the foregoing description taken in connection with the drawings, the operation and advantages of this invention will be readily understood by those skilled in the art to which it appertains. Stalks fed over the feeder frames A with their butt ends to the rollers 10, 11 will be assisted by said rollers and carried therebetween, being crushed by the rollers and slit or shredded longitudinally by the cutters 12. The butt ends are severed by the rotary cutter 32, and the ears will drop upon the inclined series of cutters 17 which coöperate with the cutters 15 to shred and to loosen the husk before the ears drop upon the stripping rollers, which latter will seize hold of the husks. The husks are carried downward between the stripping rollers and the ears will slide downwardly along the latter, being eventually discharged at the tail end of the machine.

It is obvious that a suitable conveyer may be employed to carry off the stalks after being crushed and shredded, but such conveyers are in common use, and it has not been deemed necessary to illustrate the same.

Having thus described the invention what is claimed as new, is:—

1. In a machine of the character described, stalk engaging crushing rollers, a pair of feeder frames disposed in advance of the same and having recessed cross bars, one of said feeder frames being equipped with a stalk retaining yoke, a shaft supported for rotation intermediate the feeder frames, an arm extending radially from the shaft and carrying a rotary cutting disk, and means for imparting rotary motion to said disk from the shaft when the latter is rotated.

2. In a machine of the character described, stalk engaging crushing rollers, a pair of feeder frames disposed in advance of the same, a driven shaft supported intermediate the feeder frames and having a radially extending arm, a rotary cutter supported for orbital movement by said arm, and operating mechanism.

3. In a machine of the character described, a pair of stalk engaging crushing rollers, a pair of feeder frames disposed in advance of the rollers and having recessed sharp-edged cross bars, one of said frames being provided with a stalk retaining yoke, means for severing the stalks between the feeder frames and the crushing rollers, and husk loosening cutters supported for rotation beneath the feeder frames.

4. In a machine of the character described, stalk engaging rollers, a feeder frame disposed in advance of said rollers, stalk severing means between the feeder frame and the rollers, a plurality of shafts supported for rotation in a downwardly and forwardly inclined plane beneath the feeder frame, husk loosening toothed disks upon said shafts, a shaft supported for rotation above and adjacent to the lowermost shaft of the inclined series, toothed husk loosening disks upon said shaft, and means for rotating the latter shaft reversely to the direction of the disks on said plurality of shafts, and means for rotating the disk carrying shafts of the inclined series.

5. In a machine of the character described, stalk engaging rollers, feeder frames disposed in advance of the same, stalk severing means intermediate the feeder frames and the rollers, husk loosening disks supported for rotation beneath the feeder frame, some of said disks being serially disposed in an inclined plane and rotated in one direction and some of said disks being supported above the lowermost disks of the inclined series and rotated reversely thereto, and husk stripping rollers supported in pairs below the husk stripping disks.

In testimony whereof I affix my signature in presence of two witnesses.

JOSEPH B. OSBORN.

Witnesses:
   Mrs. HORACE A. DRAKE,
   O. S. HIGGINS.